(12) United States Patent
Bauer

(10) Patent No.: US 6,637,149 B1
(45) Date of Patent: Oct. 28, 2003

(54) BEE AND WASP TRAP

(76) Inventor: David M. Bauer, 4125 Fountain Plaza Dr., Brookfield, WI (US) 53005

( * ) Notice: Subject to any disclaimer, the term of this patent is extended or adjusted under 35 U.S.C. 154(b) by 0 days.

(21) Appl. No.: 10/266,205

(22) Filed: Oct. 7, 2002

(51) Int. Cl.[7] .................................................. A01M 1/20
(52) U.S. Cl. ............................................. 43/107; 43/122
(58) Field of Search ........................... 43/107, 110, 122, 43/131, 132.1, 124

(56) References Cited

U.S. PATENT DOCUMENTS

| | | | | |
|---|---|---|---|---|
| 1,085,329 A | * | 1/1914 | Gabel .......................... | 43/122 |
| 1,139,717 A | * | 5/1915 | Pipenhagen ................... | 43/121 |
| 1,786,704 A | * | 12/1930 | Deibele ........................ | 43/122 |
| 1,968,954 A | * | 8/1934 | Metzger ....................... | 43/107 |
| 2,193,492 A | * | 3/1940 | Richardson ................... | 43/107 |
| 4,035,946 A | * | 7/1977 | Rapp et al. ................... | 43/131 |
| 4,450,647 A | * | 5/1984 | Schmidt ........................ | 43/55 |
| 4,551,941 A | * | 11/1985 | Schneidmiller .............. | 43/107 |
| 4,873,787 A | * | 10/1989 | Schneidmiller .............. | 43/122 |
| 5,033,229 A | * | 7/1991 | Demarest et al. ............. | 43/131 |
| 5,243,781 A | * | 9/1993 | Carter .......................... | 43/122 |
| 5,501,033 A | * | 3/1996 | Wefler ......................... | 43/131 |
| 5,522,171 A | * | 6/1996 | Mandeville ................... | 43/122 |
| 5,557,880 A | * | 9/1996 | Schneidmiller .............. | 43/122 |
| 5,685,109 A | * | 11/1997 | Rimback ....................... | 43/122 |
| 5,943,816 A | * | 8/1999 | Hyatt et al. ................... | 43/131 |
| 6,016,625 A | * | 1/2000 | Bishoff et al. ................ | 43/121 |
| 6,138,402 A | * | 10/2000 | Wotton ......................... | 43/122 |
| 6,430,868 B1 | * | 8/2002 | Plato et al. ................... | 43/121 |

FOREIGN PATENT DOCUMENTS

| | | | |
|---|---|---|---|
| DE | 341946 | * | 9/1920 |
| FR | 2529439 | * | 1/1984 |
| GB | 127542 | * | 6/1919 |
| JP | 5-15285 | * | 1/1993 |

* cited by examiner

Primary Examiner—Peter M. Poon
Assistant Examiner—David Parsley

(57) ABSTRACT

A bee and wasp trap is provided, comprising a threaded cylindrical base unit with handles, a bait, a curved funnel shaped insert having internal lugs containing holes and configured to thread into the base unit, and a lid having tabs with pins, such that rotation of the lid engages the pins within the lug holes, and such that removal of the lid turns the trap on. The bee and wasp trap has particular utility in connection with efficient abatement of bees, yellow jackets, and other stinging insects around the exterior of residential homes and other outdoor locations.

7 Claims, 5 Drawing Sheets

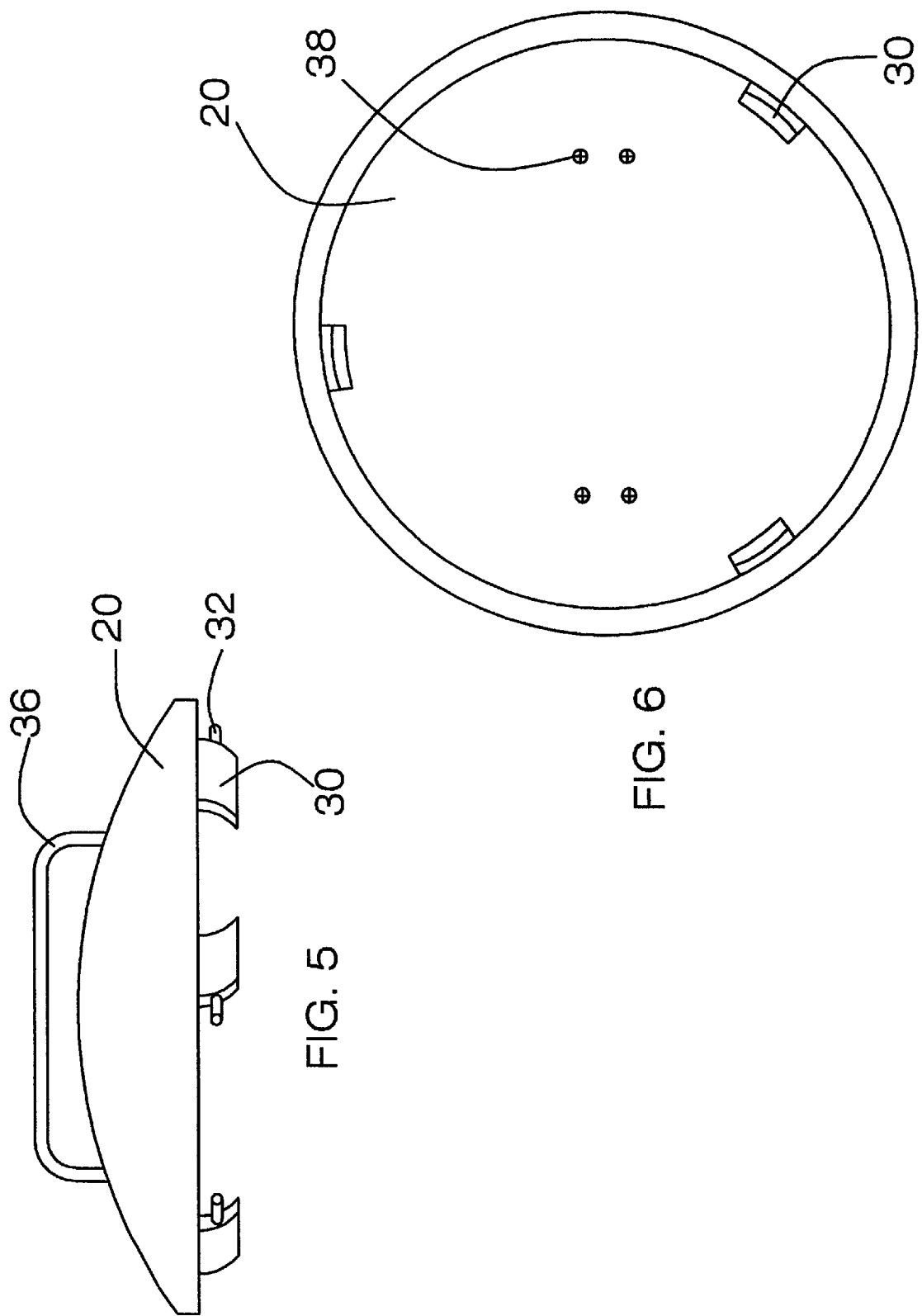

BEE AND WASP TRAP

BACKGROUND OF THE INVENTION

1. Field of the Invention

The present invention relates to a bee and wasp trap for use in connection with outdoor activities. The bee and wasp trap has particular utility in connection with efficient abatement of bees, yellow jackets, and other stinging insects around the exterior of residential homes.

2. Description of the Prior Art

Bee and wasp traps are desirable for trapping stinging insects and allowing individuals to enjoy outdoor activities.

The use of insect traps is known in the prior art. For example, U.S. Pat. No. 1,772,729 to Pisani discloses an insect trap. However, the Pisani '729 patent does not provide for attracting insects to the trap, and has the further drawbacks of not providing for hanging the trap to efficiently attract flying insects, and not providing for turning the trap on and off to make the trap active and inactive at different times.

U.S. Pat. No. 1,139,717 to Pipenhagen discloses an insect trap. However, the Pipenhagen '717 patent does not provide for hanging the trap, and additionally does not provide for turning the trap on and off.

U.S. Pat. No. 5,557,880 to Schneidmiller discloses a yellow jacket trap. However, the Schneidmiller '880 patent does not provide for turning the trap on and off to make the trap active and inactive at different times.

Similarly, U.S. Pat. No. 4,551,941 to Schneidmiller discloses an insect trap selective for wasps. However, the Schneidmiller '941 patent does not provide for turning the trap on and off to make the trap active and inactive at different times.

Similarly, U.S. Pat. No. Des. 372,513 to Schneidmiller discloses the top portion of a yellow jacket control trap. However, the Schneidmiller '513 patent does not provide a complete and active insect trap.

U.S. Pat. No. 5,392,560 to Donahue et al. discloses an insect trap. However, the Donahue '560 patent does not provide for easily turning the trap on and off to make the trap active and inactive at different times.

U.S. Pat. No. 1,185,935 to Pugh discloses an insect trap. However, the Pugh '935 patent does not provide for hanging the trap to efficiently attract flying insects, and additionally does not provide for turning the trap on and off to make the trap active and inactive at different times.

Lastly, U.S. Pat. No. 3,962,461 to Brown, Jr. et al. discloses a bait insecticide for carpenter ants. However, the Brown, Jr. '461 patent does not provide an apparatus to trap flying insects.

While the above-described devices fulfill their respective, particular objectives and requirements, the aforementioned patents do not describe a bee and wasp trap that allows efficient abatement of bees, yellow jackets, and other stinging insects around the exterior of residential homes. The prior art patents makes no provision for an efficient design to facilitate attracting flying insects and to easily turn the trap on and off to make the trap active and inactive at different times.

Therefore, a need exists for a new and improved bee and wasp trap that can be used for efficient abatement of bees, yellow jackets, and other stinging insects around the exterior of residential homes. In this regard, the present invention substantially fulfills this need. In this respect, the bee and wasp trap according to the present invention substantially departs from the conventional concepts and designs of the prior art, and in doing so provides an apparatus primarily developed for the purpose of efficient abatement of bees, yellow jackets, and other stinging insects around the exterior of residential homes and at the location of outdoor activities.

SUMMARY OF THE INVENTION

In view of the foregoing disadvantages inherent in the known types of insect traps now present in the prior art, the present invention provides an improved bee and wasp trap, and overcomes the above-mentioned disadvantages and drawbacks of the prior art. As such, the general purpose of the present invention, which will be described subsequently in greater detail, is to provide a new and improved bee and wasp trap which has all the advantages of the prior art mentioned heretofore and many novel features that result in a bee and wasp trap which is not anticipated, rendered obvious, suggested, or even implied by the prior art, either alone or in any combination thereof.

To attain this, the present invention essentially comprises a bee and wasp trap, comprising a base unit, at least one side handle connected to the outer surface of the base unit, a funnel shaped insert having a narrow opening at the bottom and configured to fit within the base unit, a lid, and a bait inside the bottom of the base unit.

In one embodiment, the present invention comprises a bee and wasp trap, comprising a base unit, at least one side handle connected to the outer surface of the base unit, a hole in each side handle, a funnel shaped insert having a narrow opening at the bottom and configured to fit within the base unit, at least one internal lug connected to the top of the funnel shaped insert, a hole in each lug, a lid, at least one tab connected to the bottom of the lid, at least one pin connected to the side of each tab, a top handle connected to the lid, and a bait inside the bottom of the base unit.

In another embodiment, the present invention comprises a bee and wasp trap for efficient abatement of bees, wasps, and other stinging insects, comprising a cylindrical base unit having a bottom surface and a curved side wall, two side handles connected to the outside of the side wall of the base unit, a hole in each side handle, an internal thread at the top of the side wall of the base unit, a curved funnel shaped insert having a narrow opening at the bottom and an external thread at the wide top configured to fit the internal thread of the side wall of the base unit, a plurality of internal lugs connected to the top of the funnel shaped insert, a hole in each lug, a lid, a plurality of tabs connected to the bottom of the lid, at least one pin connected to the side of each tab, a top handle connected to the lid, and a bait inside the bottom of the cylindrical base unit, wherein the lid is configured to fit at the top of the base unit and funnel shaped insert such that rotation of the lid engages the pins within the lug holes and reverse rotation disengages the pins from the lug holes, and such that removal of the lid turns the trap on to attract bees, wasps, and other stinging insects.

There has thus been outlined, rather broadly, the more important features of the invention in order that the detailed description thereof that follows may be better understood and in order that the present contribution to the art may be better appreciated.

The invention may also include screws, hooks, and other attachments. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bee and wasp trap that has all of the advantages of the prior art insect traps and none of the disadvantages.

It is another object of the present invention to provide a new and improved bee and wasp trap that may be easily and efficiently manufactured and marketed.

An even further object of the present invention is to provide a new and improved bee and wasp trap that has a low cost of manufacture with regard to both materials and labor, and which accordingly is then susceptible of low prices of sale to the consuming public, thereby making such bee and wasp trap economically available to the buying public.

Still another object of the present invention is to provide a new bee and wasp trap that provides in the apparatuses and methods of the prior art some of the advantages thereof, while simultaneously overcoming some of the disadvantages normally associated therewith.

Even still another object of the present invention is to provide a bee and wasp trap for efficient abatement of bees, yellow jackets, and other stinging insects around the exterior of residential homes. This prevents these insects from returning to a hive or nest and drawing more insects to the exterior of the homes.

Still yet another object of the present invention is to provide a bee and wasp trap for efficient abatement of bees, yellow jackets, and other stinging insects around the location of outdoor activities. This makes it possible for individuals to enjoy outdoor activities without being stung by insects.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front elevational view of the lid of the bee and wasp trap of the present invention.

FIG. 6 is a bottom side view of the lid of the bee and wasp trap of the present invention.

The same reference numerals refer to the same parts throughout the various figures.

DESCRIPTION OF THE PREFERRED EMBODIMENT

Figure 1:
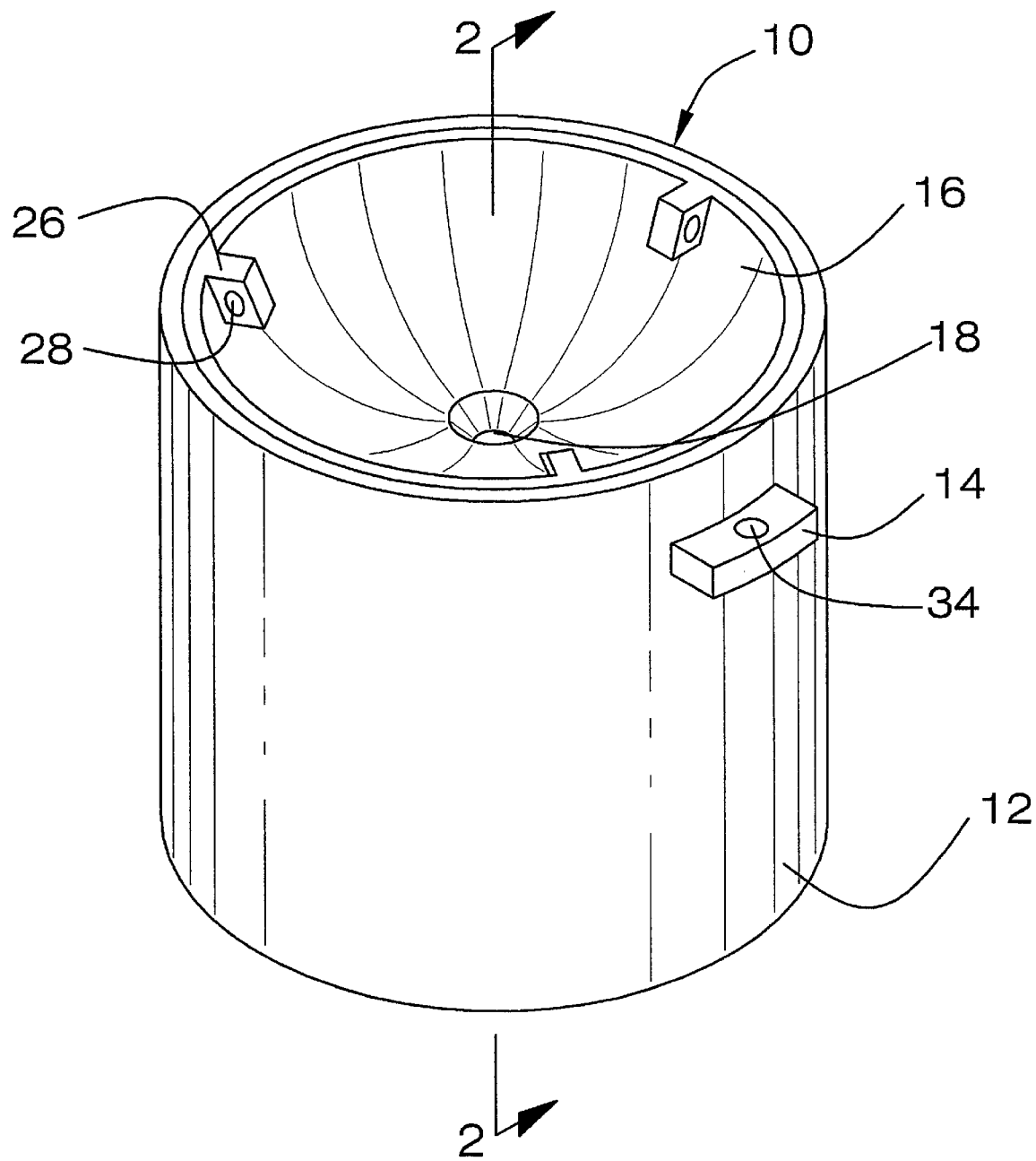
FIG. 1 is an isometric perspective view of the preferred embodiment of the bee and wasp trap constructed in accordance with the principles of the present invention.

Referring now to the drawings, and particularly to FIGS. 1–6, a preferred embodiment of the bee and wasp trap of the present invention is shown and generally designated by the reference numeral 10.

In FIG. 1, a new and improved bee and wasp trap 10 of the present invention for efficient abatement of bees, yellow jackets, and other stinging insects around the exterior of residential homes is illustrated and will be described. More particularly, the bee and wasp trap 10 comprises a cylindrical base unit 12 having a bottom surface and a curved side wall, two side handles 14 connected to the outside of the side wall of the base unit 12, a handle hole 34 in each side handle 14, a curved funnel shaped insert 16 having a narrow opening 18 at the bottom, three internal lugs 26 connected to the top of the funnel shaped insert 16, and a lug hole 28 in each lug 26.

Figure 2:
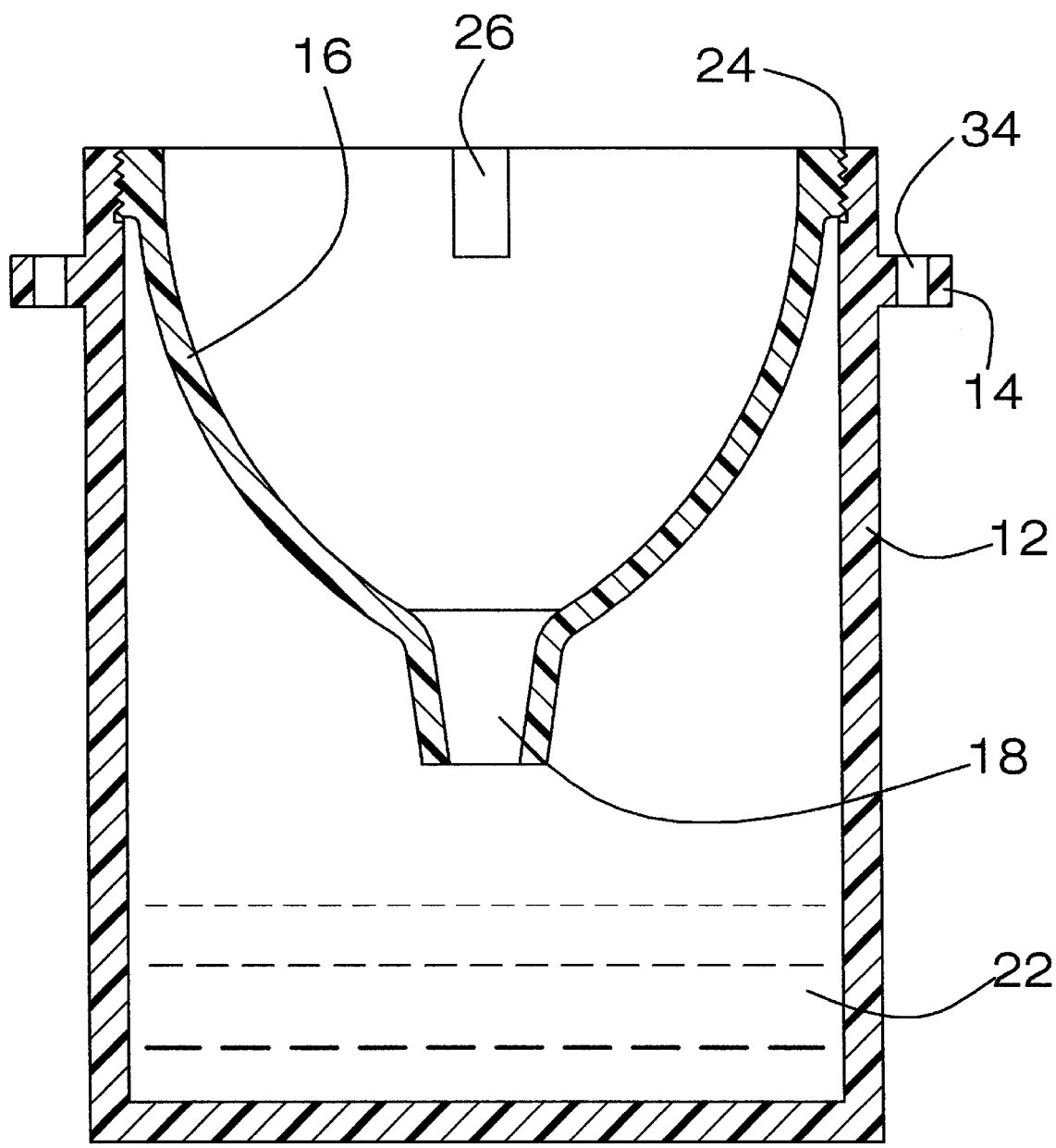
FIG. 2 is a front elevational cross-sectional view of the bee and wasp trap of the present invention illustrated in FIG. 1 and taken along the line 2—2.

FIG. 2 is a front elevational cross-sectional view of the bee and wasp trap of the present invention, and illustrates the cylindrical base unit 12, two side handles 14 connected to the outside of the side wall of the base unit 12, a handle hole 34 in each side handle 14, an internal thread 24 at the top of the side wall of the base unit 12, a curved funnel shaped insert 16 having a narrow opening 18 at the bottom and an external thread 24 at the wide top configured to fit the internal thread 24 of the side wall of the base unit 12, and a lug 26 connected to the top of the funnel shaped insert 16. A bait 22, preferably comprising sugar in a liquid, is contained in the bottom of the cylindrical base unit 12 such that bees, wasps, and other stinging insects are attracted to the bait 22 through the narrow opening 18 of the funnel shaped insert 16 and become trapped.

Figure 3:
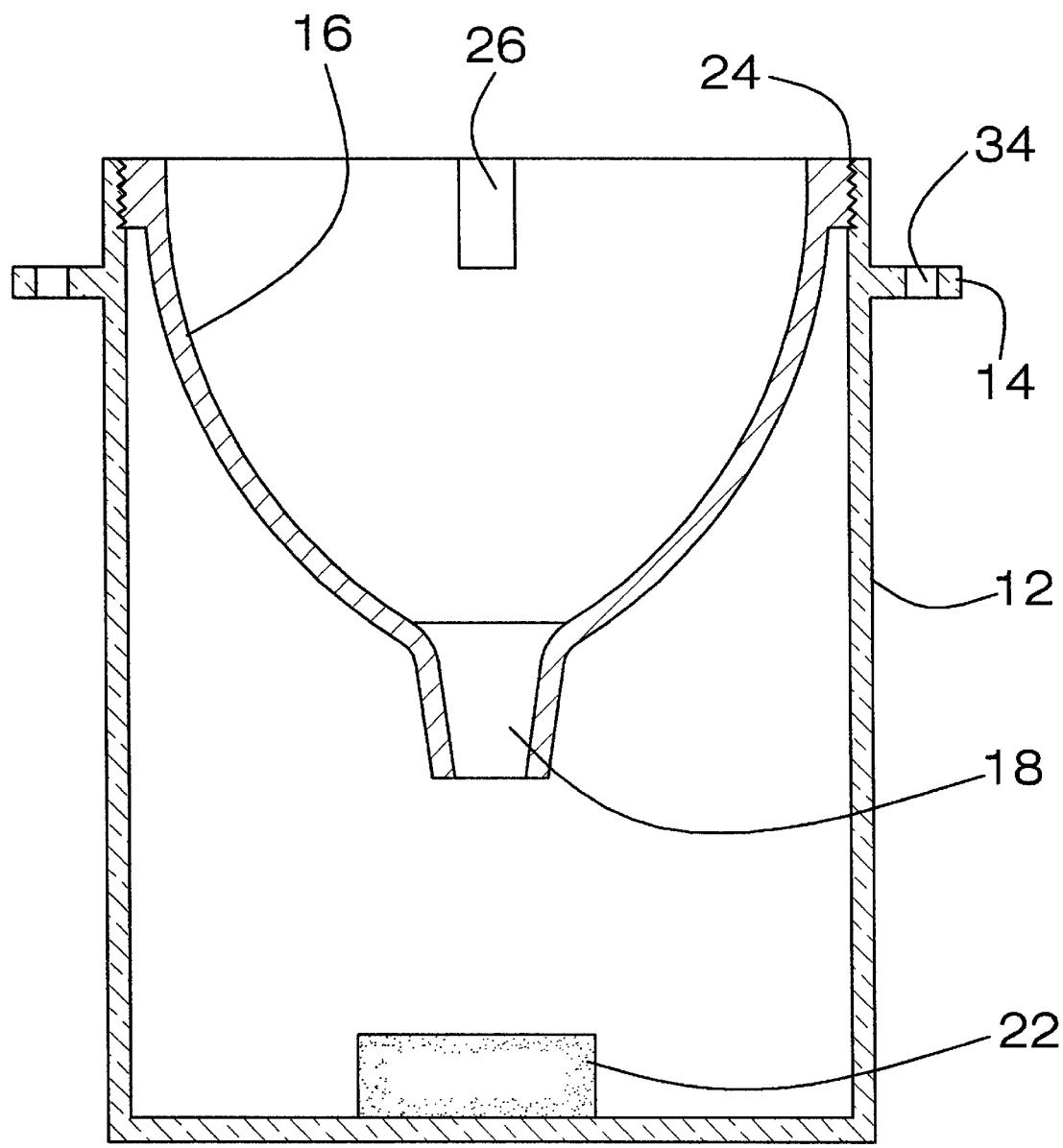
FIG. 3 is a front elevational cross-sectional view of the bee and wasp trap of the present invention having a solid bait.

FIG. 3 is a front elevational cross-sectional view of the bee and wasp trap of the present invention, and illustrates the cylindrical base unit 12, two side handles 14 connected to the outside of the side wall of the base unit 12, a handle hole 34 in each side handle 14, an internal thread 24 at the top of the side wall of the base unit 12, a curved funnel shaped insert 16 having a narrow opening 18 at the bottom and an external thread 24 at the wide top configured to fit the internal thread 24 of the side wall of the base unit 12, and a lug 26 connected to the top of the funnel shaped insert 16.

A solid bait 22 in the bottom of the cylindrical base unit 12 attracts bees, wasps, and other stinging insects.

Figure 4:
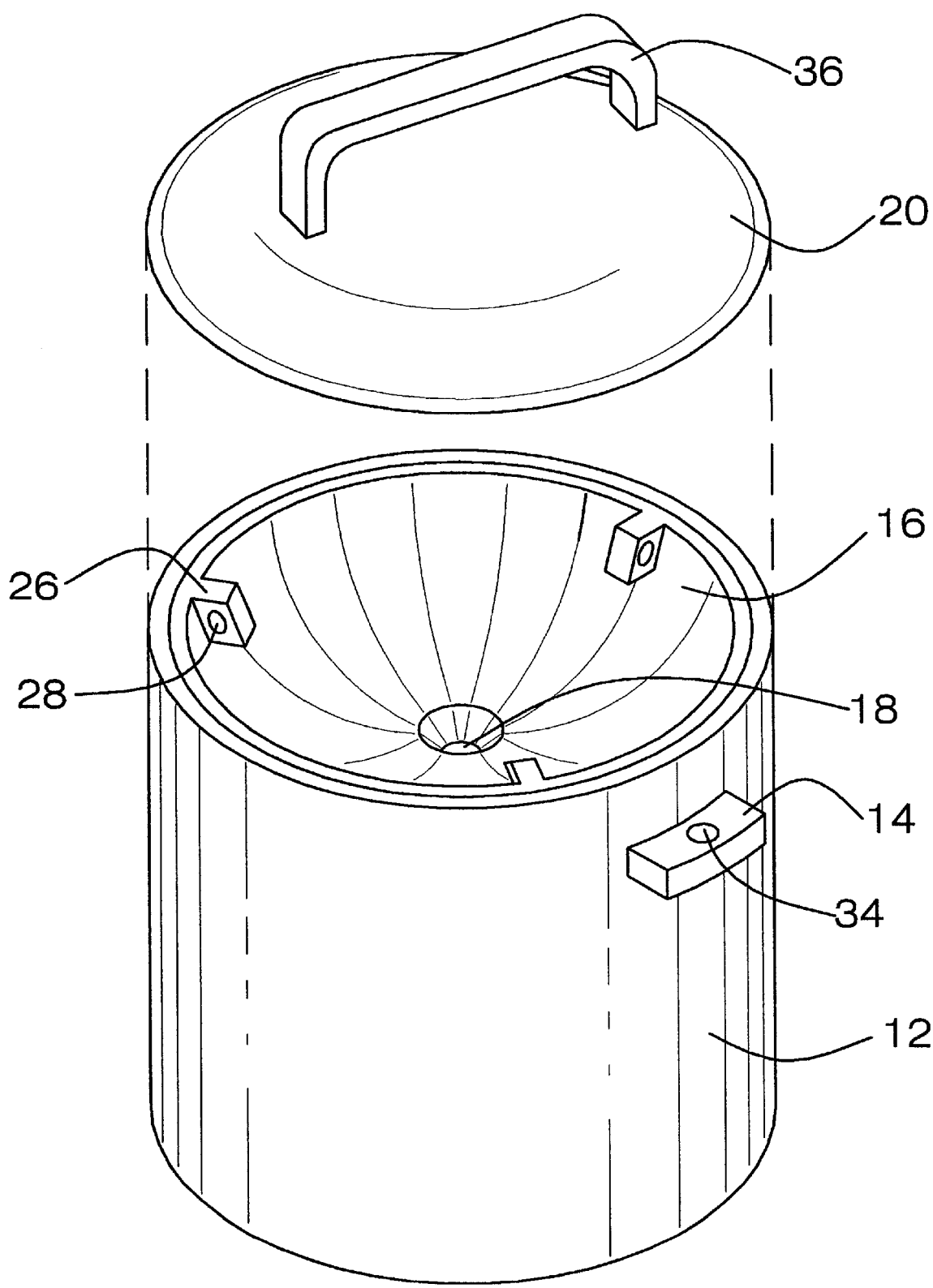
FIG. 4 is an isometric perspective view of the bee and wasp trap of the present invention illustrating placement of the lid.

FIG. 4 is an isometric perspective view of the bee and wasp trap of the present invention, and illustrates a cylindrical base unit 12 having a bottom surface and a curved side wall, two side handles 14 connected to the outside of the side wall of the base unit 12, a handle hole 34 in each side handle 14, a curved funnel shaped insert 16 having a narrow opening 18 at the bottom, three internal lugs 26 connected to the top of the funnel shaped insert 16, and a lug hole 28 in each lug 26, a lid 20, and a top handle 36.

FIG. 5 is a front elevational view of the lid 20 of the bee and wasp trap of the present invention, and illustrates the lid 20, a top handle 36 connected to the lid 20, three tabs 30 connected to the bottom of the lid 20, and a pin 32 connected to the side of each tab 30. The lid 20 is configured to fit at the top of the base unit and funnel shaped insert of the bee and wasp trap such that rotation of the lid 20 engages the pins 32 within the lug holes connected to the top of the funnel shaped insert, and reverse rotation disengages the pins from the lug holes. Removal of the lid 20 turns the trap on to attract bees, wasps, and other stinging insects. Replacement of the lid 20 turns the trap off.

FIG. 6 is a bottom side view of the lid 20 of the bee and wasp trap of the present invention, and illustrates the lid 20, tabs 30, and screws 38 connecting the top handle to the lid.

The bee and wasp trap of the present invention preferably comprises a plastic material. Suitable plastics include molded poly(vinyl chloride) (PVC), polystyrene (PS), polypropylene (PP), a polyethylene (PE) such as high density polyethylene (HDPE), an acrylonitrile-butadiene-styrene (ABS) resin, a styrene-acrylonitrile (SAN) resin, polycarbonate (PC), a polyester such as polyethylene terephthalate (PET) or polybutylene terephthalate (PBT), or blends thereof, as well as any other suitable plastic material known to those skilled in the art.

The bee and wasp trap of the present invention more preferably comprises a transparent plastic material. Suitable transparent plastics include poly(methyl methacrylate) (PMMA), polystyrene (PS), polycarbonate (PC), a polyester such as polyethylene terephthalate (PET), and the like.

The bee and wasp trap of the present invention is a device that is used for abatement of bees, yellow jackets, and other stinging insects around the exterior of residential homes and other locations. In one embodiment, it is largely fabricated of plastic. In this embodiment, it comprises a bucket that measures about 12 inches high by about 8 to 10 inches in diameter. Its upper end features a pair of handling tabs on its outer surface, while its extreme upper end incorporates an internal thread. This thread is used to mount a curved, funnel-shaped insert. The interior of the upper end of this funnel features a series of lugs that facilitate its installation and removal. In one embodiment, the vessel is filled with a sugar water solution and the funnel fitted. It is then set up in the desired area. In use, stinging insects are attracted by the sugar water solution. Upon entering the unit's funnel-shaped insert, they become trapped and eventually drown.

The bee and wasp trap of the present invention fulfills the need for an improved method of controlling bees and related insects. The appealing features of the bee and wasp trap of the present invention include its small size, efficiency, convenience, and ease of use. This product is easily set up on a flat top of a fence post, garbage can, dumpster, or related convenient support, or even simply on the ground. It is preferably hung utilizing holes in the side handles to facilitate attraction of flying insects. In use, it effectively traps and kills bees, yellowjackets, and related insects, thereby preventing them both from stinging people and from returning to a hive or nest and drawing more insects to a particular location.

The bee and wasp trap of the present invention is produced easily using conventional and readily available materials and manufacturing processes. In a preferred embodiment, the bee and wasp trap is fabricated of injection-molded high-density polyethylene, polyvinylchloride, or another suitable thermoplastic.

In one embodiment, the bee and wasp trap of the present invention comprises a reservoir which includes an open upper region for receiving a funnel type trap therein, such that the trap has an upper surface manipulated by a nib element incorporated into the upper surface for turning the present invention on and off, and such that a series of supplemental handles positioned about the outside of the reservoir allows for easy hanging of the trap.

In use, it can now be understood that the bee and wasp trap of the present invention has particular utility in connection with efficient abatement of bees, yellow jackets, and other stinging insects around the exterior of residential homes and at the location of outdoor activities.

While a preferred embodiment of the bee and wasp trap has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, composite material, or a variety of wood may be used instead of the plastic described. Also, the trap may comprise many different sizes and shapes instead of those described. And although efficient abatement of bees, yellow jackets, and other stinging insects around the exterior of residential homes has been described, it should be appreciated that the bee and wasp trap herein described is also suitable for use at the location of any outdoor activity. Furthermore, a wide variety of natural and artifical baits may be used instead of the sugar water described.

Therefore, the foregoing is considered as illustrative only of the principles of the present invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bee and wasp trap for efficient abatement of bees, wasps, and other stinging insects, comprising:
    a cylindrical base unit having a bottom surface and a curved side wall;
    two side handles each defining a hole therein, said side handles connected to the outside of said side wall of said base unit;
    an internal thread at the top of said side wall of said base unit;
    a curved funnel shaped insert having a narrow opening at the bottom and an external thread at the wide top configured to fit said internal thread of said side wall of said base unit;

a plurality of internal lugs each defining a hole therein, said internal lugs connected to the top of said funnel shaped insert;

a lid configured to cover said wide top of said curved funnel shaped insert;

a plurality of tabs connected to the bottom of said lid;

at least one pin connected to the side of each said tab;

a top handle connected to said lid; and a bait inside the bottom of said cylindrical base unit;

wherein said lid is configured to fit at the top of said base unit and over said wide top of said funnel shaped insert, such that rotation of said lid engages said pins within said lug holes and reverse rotation disengages said pins from said lug holes, and such that placement of said lid over the top of said base unit and over said wide top of said funnel shaped insert inactivates the trap, and such that removal of said lid activates the trap to attract bees, wasps, and other stinging insects.

2. The bee and wasp trap of claim 1, further comprising a plurality of screws connecting said top handle to said lid.

3. The bee and wasp trap of claim 1, wherein said bait comprises sugar in a liquid.

4. The bee and wasp trap of claim 1, wherein said base unit and said funnel shaped insert each comprise a plastic material.

5. The bee and wasp trap of claim 1, wherein said base unit and said funnel shaped insert each comprise at least one of poly(vinyl chloride), polypropylene, polyethylene, acrylonitrile-butadiene-styrene resin, styrene-acrylonitrile resin, polycarbonate, polyethylene terephthalate, polybutylene terephthalate, and blends thereof.

6. The bee and wasp trap of claim 1, wherein said base unit and said funnel shaped insert each comprise a transparent plastic material.

7. The bee and wasp trap of claim 1, wherein said base unit and said funnel shaped insert each comprise at least one of poly(methyl methacrylate), polystyrene, polycarbonate, and polyethylene terephthalate.

\* \* \* \* \*